US 8,590,674 B2

(12) United States Patent
Jette

(10) Patent No.: US 8,590,674 B2
(45) Date of Patent: Nov. 26, 2013

(54) CHOCK SYSTEM

(75) Inventor: Gaetan Jette, Mascouche (CA)

(73) Assignee: 9172-9863 Quebec Inc., Terrebonne, Quebec (CA)

(*) Notice: Subject to any disclaimer, the term of this patent is extended or adjusted under 35 U.S.C. 154(b) by 256 days.

(21) Appl. No.: 12/932,287

(22) Filed: Feb. 23, 2011

(65) Prior Publication Data
US 2011/0226565 A1 Sep. 22, 2011

(30) Foreign Application Priority Data

Feb. 23, 2010 (CA) .................................. 2694436

(51) Int. Cl.
B60T 3/00 (2006.01)

(52) U.S. Cl.
USPC ................ 188/32; 188/4 R; 188/5; 410/7

(58) Field of Classification Search
USPC ............... 188/4 R, 5, 6, 32, 36; 410/7, 8, 9; 414/396, 401, 429, 584
See application file for complete search history.

(56) References Cited

U.S. PATENT DOCUMENTS

| 4,217,831 A | 8/1980 | Koliba et al. |
| 4,833,442 A | 5/1989 | Von Heck |
| 4,963,068 A | 10/1990 | Gelder |
| 4,969,792 A | 11/1990 | Ellis et al. |
| 4,973,213 A | 11/1990 | Erlandsson |
| 5,025,877 A | 6/1991 | Assh |
| 5,312,213 A * | 5/1994 | Winsor ............................. 410/9 |
| 5,410,897 A | 5/1995 | Edmondson |
| 5,520,034 A | 5/1996 | Edmondson |
| 5,553,987 A | 9/1996 | Ellis |
| 5,582,498 A | 12/1996 | Springer et al. |
| 5,664,930 A | 9/1997 | Ellis |
| 5,762,459 A | 6/1998 | Springer et al. |
| 5,803,208 A | 9/1998 | Blach |
| 6,092,970 A | 7/2000 | Hahn et al. |
| 6,123,496 A | 9/2000 | Alexander |
| 6,238,163 B1 | 5/2001 | Springer et al. |
| 6,336,527 B1 | 1/2002 | Metz |
| RE37,570 E | 3/2002 | Springer et al. |
| 6,505,713 B1 | 1/2003 | Paul et al. |
| 6,773,221 B2 | 8/2004 | Belongia et al. |
| 6,851,523 B1 * | 2/2005 | Gaster ............................. 188/32 |
| 6,938,734 B2 | 9/2005 | Curl |
| 7,032,720 B2 | 4/2006 | Jette et al. |
| 7,226,265 B2 | 6/2007 | Wilson |
| 7,264,092 B2 | 9/2007 | Jette |
| 7,537,095 B2 | 5/2009 | Eriksson |

(Continued)

FOREIGN PATENT DOCUMENTS

| CA | 2164738 C | 6/1997 |
| CA | 2238369 C | 6/1997 |
| EP | 0496727 B1 | 8/1992 |
| JP | 01289745 A * | 11/1989 |

Primary Examiner — Thomas J Williams
(74) Attorney, Agent, or Firm — Ipaxio S.E.N.C.

(57) ABSTRACT

A wheel chock restraint system which comprises a wheel chock having a base, a plurality of teeth extending outwardly from the base, the teeth extending in a first direction, and a locking member mounted within the chock, the locking member having a plurality of locking member teeth extending from a bottom thereof, the locking member teeth extending in a second direction generally opposed to the first direction, and an arrangement for moving the locking member in a generally vertical direction.

3 Claims, 3 Drawing Sheets

(56) References Cited

U.S. PATENT DOCUMENTS

| | | |
|---|---|---|
| 7,914,042 B2 | 3/2011 | Andersen et al. |
| 8,006,811 B2 | 8/2011 | Andersen et al. |
| 8,047,751 B2 * | 11/2011 | Powers et al. .................. 410/20 |
| 2008/0124203 A1 | 5/2008 | McDonald |
| 2009/0026022 A1 | 1/2009 | Andersen et al. |
| 2009/0194375 A1 * | 8/2009 | Andersen et al. ............... 188/32 |
| 2009/0194376 A1 * | 8/2009 | Brooks et al. ................... 188/32 |
| 2009/0223764 A1 | 9/2009 | Andersen et al. |
| 2010/0170754 A1 * | 7/2010 | Brooks et al. ................... 188/32 |
| 2010/0260586 A1 | 10/2010 | Manone et al. |
| 2011/0240416 A1 * | 10/2011 | Brooks et al. ................... 188/32 |

* cited by examiner

CHOCK SYSTEM

FIELD OF THE INVENTION

The present invention relates to wheel chocks, and more particularly to a wheel chock restraint system to engage the wheel of a truck to prevent it moving away from a location.

BACKGROUND OF THE INVENTION

Vehicles such as semi trailers are often removed from locations at undesired moments. They can be stolen from a company yard, parking lot or truck stops. This situation can also happen at a loading dock. Some reports say that more than 30 billion dollars worth of goods disappear with stolen semi trailers. Some places secure their area with fences and gates, some may also have guards to help control the security. There are no reported systems to secure a specific vehicle in those areas.

Loading and unloading operations are hazardous for forklift trucks entering and exiting a truck trailer. It is imperative that a truck remain immovably docked at the loading dock to prevent moving fork lifts from falling through the space created if a truck trailer moves.

There are two known types of restraint systems: ICC bar restraint systems to prevent the truck from moving away from the dock, and wheel restraint systems. However, while the first system is suitable for a majority of trailers, there are several configurations of trucks that cannot be secured by such ICC bars. Besides, ICC bars are built to absorb a rear impact with another truck and are not designed to resist a strong pulling force. In view of this fact, this system does not prevent the truck from moving away from the loading dock. The second category includes manual and mechanical chocks. Manual placement of a chock presents different problems, such as chocks which may be displaced, damaged, lost, or stolen. They also may slip on icy, oily or dusty surfaces and are often difficult to remove from their operational position because they may be wedged very tightly under the trailer's wheel. Very often, chocks are removed before the loading operation is complete, thus creating a dangerous situation where the vehicle can depart prematurely or slide away from the dock as heavy fork lifts enter the trailer. Also, docked trailers can be stolen mostly after business hours. In a lot of cases, trailers are a target for theft as they are loaded with valuables.

Mechanical wheel chock systems are more effective than manual chocks. They also are not very easy to service and often have to travel a substantial distance from storage into operative position. Other mechanical chocks which are mounted on the surface may be affected by winter and become an obstacle during snow removal. They also may interfere with the tail gate of the truck or truck's undercarriage, and are inoperable with many types of vehicles.

One mechanical wheel chock restraint system known in the art and which is effective is that disclosed in U.S. Pat. No. 7,032,720 the contents of which are hereby incorporated by reference.

SUMMARY OF THE INVENTION

It is an object of the present invention to provide a wheel chock restraint system to prevent the movement of a vehicle away from a location. The location may be a loading dock or other locations such as a yard, parking lot or truck stop, wherein it is desired to lock a vehicle in a fixed location.

According to one aspect of the present invention, there is provided a wheel chock restraint system comprising a wheel chock having a base, a plurality of teeth extending outwardly from the base, the teeth extending in a first direction, a locking member mounted within the chock, the locking member having a plurality of locking member teeth extending from a bottom thereof, locking member teeth extending in a second direction which is generally opposed to the first direction and means for moving the locking member in a generally vertical direction.

The present invention utilizes a secondary locking member which acts in a counter direction to the primary chock. The secondary chock may be locked in position by suitable means so as to prevent movement thereof. Since it operates in a direction different than the primary chock, it provides a strong securement for the vehicle.

The prime advantage of one embodiment of the present invention pertains to the use of the system as an anti-theft device. When operated by a suitable power source (e.g. electric, hydraulic, pneumatic, et cetera) it functions to prevent theft of the trailer (or other vehicle). Naturally, a second chock may be utilized to immobilize the wheel.

BRIEF DESCRIPTION OF THE DRAWINGS

Having thus generally described the invention, reference will be made to the accompanying drawings illustrating an embodiment thereof, in which.

DETAILED DESCRIPTION OF THE INVENTION

Figure 1:
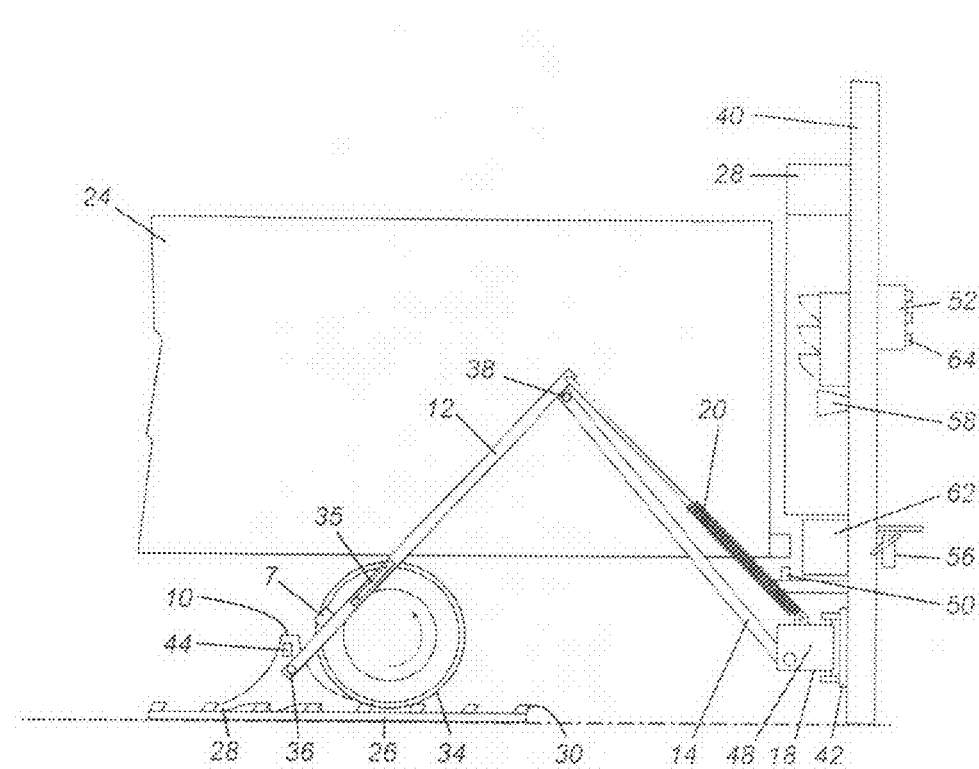
FIG. 1 is a schematic side view of a wheel chock restraint system.
Figure 2:
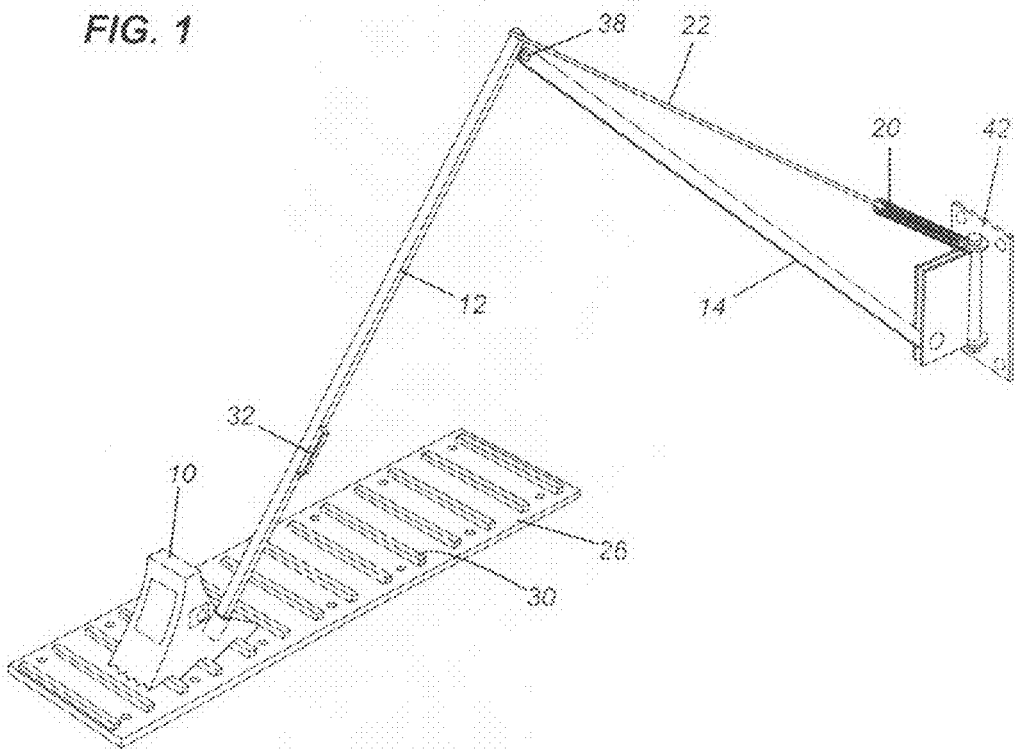
FIG. 2 is a perspective view thereof.

Referring to the drawings in greater detail, FIGS. 1 and 2 show a first embodiment of a wheel chock 10 attached to a wheel chock support means. A movable arm arrangement consists of a front arm 12 pivotally attached to a rear arm 14. Rear arm 14 is pivotally attached to a loading dock 16 by means of a pivot or bracket 18. A tension means such as an extension spring 20 is attached by one end to a bracket 18 and by another end to an upper portion of the front arm 12 by means of a cable or steel rod 22. Bracket 18 allows the arms 12, 14 to be rotated left and right and up and down, and to move it into storage position, in close proximity to the dock face (not shown) when not in use.

A locking member is fixed on the ground in the vicinity of the loading dock and comprises an elongated plate 26 long enough to spread at least under one axle of a truck 24 during loading operation to facilitate a proper engagement of wheel chock 10 with the plate 26. A base portion of the chock 10 is provided with a first engagement means or teeth 28 which are adapted to cooperate with the corresponding second engagement means or stoppers 30 located on plate 26.

Once the truck 24 is backed to the dock 16, the truck driver manually sets the chock 10 by means of a handle 32 mounted on the front arm 12 to engage the chock 10 with a wheel 34.

The spring 20 attached from the bracket 18 to the upper portion of front arm 12 by means of cable 22 assists the manipulation by the driver of the movable arms 12, 14. In this case, on one hand the retention force created by engagement of teeth 28 of chock 10 and stoppers 30 of the plate 26 is directed away from the loading dock 16 and prevents the chock 10 from sliding away from the wheel 34 of the truck 24 when the truck makes attempts to depart prematurely from the dock 16. On the another hand, arms 12, 14 create an engagement force directed towards the loading dock 16 and presses chock 10 against the wheel 34. Such a combination of two forces ensures a secure positioning of truck 24 during loading and unloading.

Front arm 12 is pivotally attached to the chock 10 by means of a lower joint 36 and front arm 12 is pivotally connected to rear arm 14 by means of upper joint 38. It should be emphasized that upper joint 38 may be of any possible configurations, such as a universal joint, bracket with a pivot or any other means which facilitates effortless pivoting of both arms. The most important feature is the fact that spring 20 is attached to the upper portion of the front arm 12. Such arrangement allows very easy manipulation of the system because the more arm A extends, the more spring 20 pulls and consequently chock 10 becomes easier to move due to the leverage effect. However, the present invention is not restricted to the use of a spring and any other tension means may be used instead to the same purpose.

Bracket 18 is attached to the dock face 40 by means of an anchor plate 42. The engagement means of the chock comprises a plurality of angled teeth 28 extending downwardly from the base portion of the chock 10. Engagement means of the plate 26 comprises a plurality of extending upwardly stoppers 30. It is understood that any other possible equivalents may be used for the same purpose. In use, chock 10 is preferably positioned in such a way that teeth 28 are directed away from the loading dock 16.

Chock restraint system of FIG. 1 is also provided with different kinds of sensors which facilitate secure loading and unloading procedures. A sensor 48 is installed on the bracket 18 to detect the extending movement of the arms 12, 14 during placement of the chock 10 under the wheel 34. Sensor 44 installed on the chock 10 is provided to detect the presence of the wheel 34 at the moment said wheel engages the chock. Sensor 54 may be installed on front arm 12. When the arm is removed from storage position, sensor 48 will send a signal to illuminate a visual indicator 46 to warn the dock workers and drivers. Visual indicator 46 will be also illuminated in response to both sensors 48 and 44 to ensure that the arm A is utilized and that the wheel 34 is properly engaged. Detecting sensors could be of many different types, such as non-contact sensors (photocell), mechanical detectors with contact arm, et cetera.

Truck presence detector 50 may be installed around the dock to detect a vehicle when arriving in the vicinity of the dock face 40. Such detector may also be of contact or non-contact (photocell) arrangement, and is preferably designed to sense when the vehicle is a few inches from the dock. Using the control panel 52, the vehicle detector 50 can be interlocked with other sensors, such as a restraint sensor 44 or 48 and a dock leveller sensor 56. Movement of the truck during loading and unloading operations can trigger a loud alarm 58 to make the truck drivers and fork lift operators aware of danger. A loading entrance 16 is provided with a dock seal 60, dock bumper 62 and interior lights 64.

In operation, when the truck backs into position with loading dock 16, wheel 34 rolls over the elongated plate 26. Once the truck 24 is backed up to dock 16, the truck driver will manually set the chock 10 by means of handle 32 mounted on the front arm 12 to engage with the wheel 34. The spring 20 attached from the bracket 18 to the upper portion of the front arm 12 by cable 22 will allow easy handling. The dock leveller 56 spans the gap between the bed of the truck 24 and the floor to allow forklifts to go in and out of the truck 24, which is backed to the dock 16 against the dock bumper 62.

The sensor 54 or sensor 44 will sense the wheel 34 to ensure a proper positioning of the chock 10, and the detector 50 of bracket 18 will signal the use of the extendable arm A. Proper positioning of the chock 10 is facilitated by articulations of bracket 18, upper joint 38 and lower joint 36. The truck presence detector 50 mounted on the bracket 18 will preferably sense the truck 24 when it is approximately 4-5 inches from the dock bumper 62. In case the truck 24 will start to move away during the loading operation, dock leveller detector 56 is interlocked with the dock leveller 27 together with the truck presence detector 50 will trigger alarm 58. All following detectors 44, 48, 50, 54 and 56 are operatively connected to the control panel 52 which will illuminate lights 46 and 64 to indicate when the loading operation is safe.

Chock 10 is preferably made from high tensile weather resistant galvanized steel which is many times harder than conventional steel. An all weather chock combined with a non-skid plate can provide 60,000 lbs of restraining force.

Figure 3:
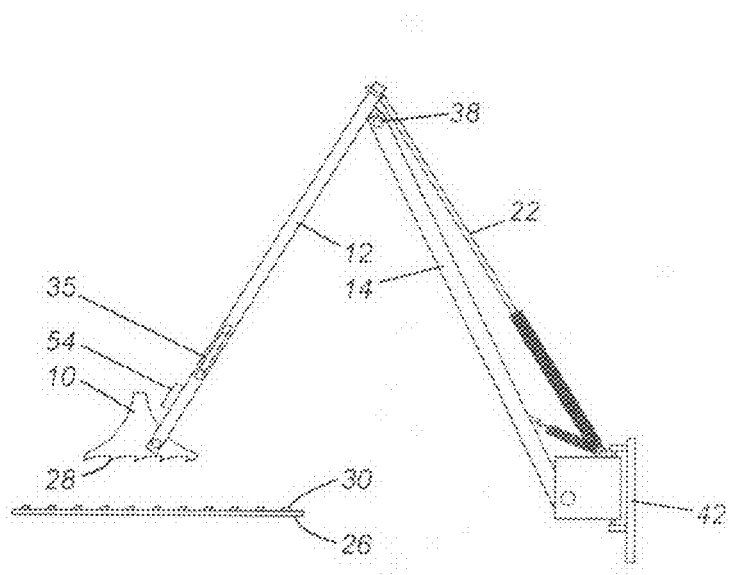
FIG. 3 is a side elevational view of a slightly modified wheel chock restraint system.

FIG. 3 shows a second arrangement wherein instead of one spring there are used two springs 16a and 16b.

For both arrangements shown on FIG. 1 and FIG. 3 the attachment point of cable or rod 22 depends upon the length of the front arm 12, weight of said arm 12 and chock 10 and the strength of the tension means.

Figure 4:
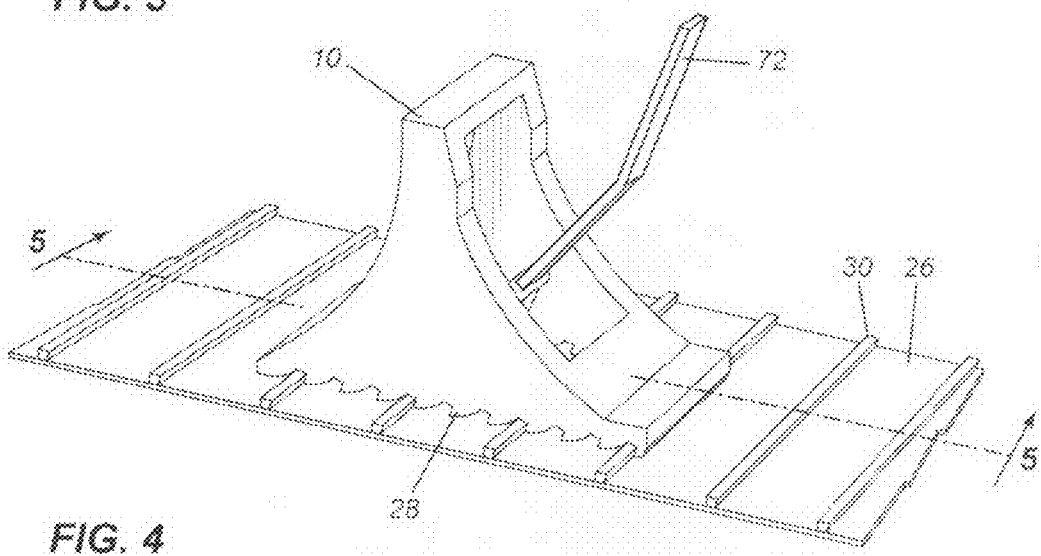
FIG. 4 is a perspective view of a modified wheel chock restraint system according to the present invention.
Figure 5:
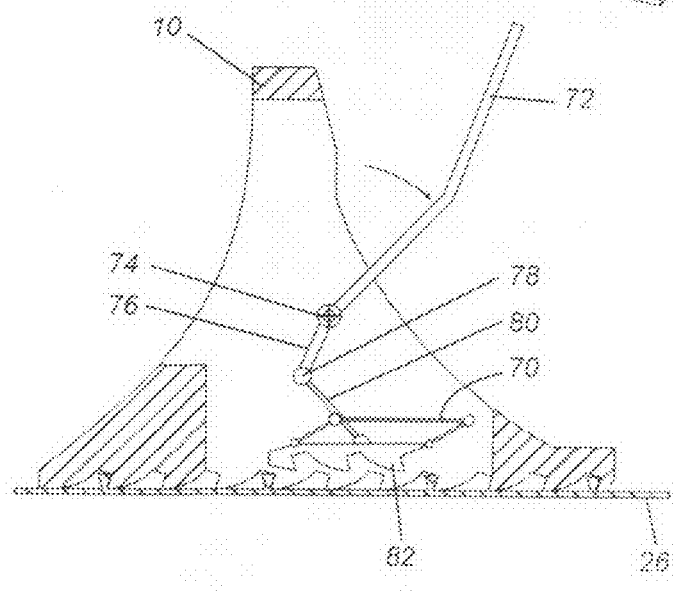
FIG. 5 is a sectional view taken along the lines 2-2 of FIG. 4.
Figure 6:
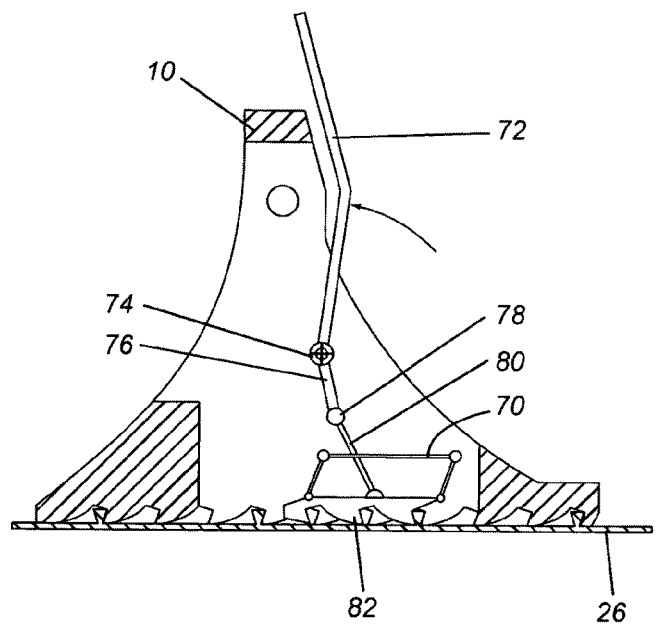
FIG. 6 is a view similar to FIG. 5 illustrating operation of the system.

In the arrangement shown in FIGS. 4 to 6, there is provided a secondary restraint 70. Secondary restraint 70 is mounted within primary wheel chock 10 and is secured at a pivot point 74. A handle or lever 72 is utilized to move secondary chock 70 into and out of position. Thus, in FIG. 5, secondary chock 70 is in a disengaged position while in FIG. 6, it is in an engaged position.

Lever 72 may be moved as indicated by the arrows in FIGS. 5 and 6. To move from the disengaged position of FIG. 5 to the engaged position of FIG. 6, lever 72 is moved upwardly and a first arm 76, which is pivotally connected to a second arm 80, which in turn is connected to secondary restraint 70 will lengthen and cause teeth 82 of secondary restraint 70 to engage with the sides of the stoppers 30 on the plate 26.

Figure 7:
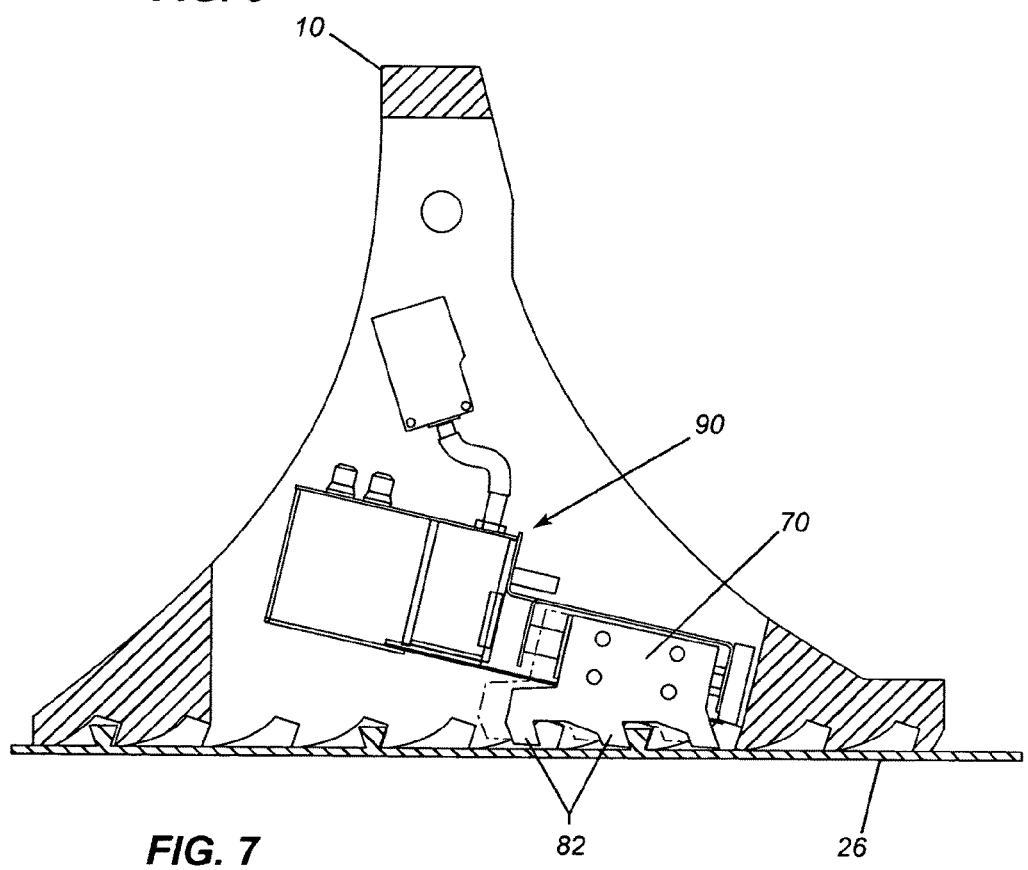
FIG. 7 is a view similar to FIG. 6 of an alternative embodiment.

Turning to the embodiment of FIG. 7, there is illustrated a power chock assembly which includes secondary restraint 70. In this embodiment, a motor assembly 90 is utilized to operate secondary restraint 70. This is advantageous with the use of the system as an anti-theft system.

Motor assembly 90 can only be operated when authorized. This may include authorization by electrical signal, a key or any other suitable means including many known arrangements. Thus, greater control is maintained over the removal of chock 10. Naturally, other than an electric motor, pneumatic, hydraulics, hand leverage, et cetera may be utilized both for the locking and unlocking motions.

It will be understood that the above described embodiments are for purposes of illustration only and that changes and modifications may be made thereto without departing from the spirit and scope of the invention.

I claim:
1. A wheel chock restraint system comprising:
   a wheel chock having a base, a plurality of teeth extending downwardly from said base, said teeth extending in a first direction;

a secondary restraint mounted within said wheel chock, the secondary restraint having a plurality of secondary restraint teeth extending from a bottom thereof, the secondary restraint teeth extending in a second direction which is generally opposed to said first direction; and a locking and unlocking motion mechanism to move the secondary restraint in a generally vertical direction between an engaged position and a disengaged position, the locking and unlocking motion mechanism comprising an electric motor.

2. A wheel chock restraint system comprising:

a wheel chock having a base, a plurality of teeth extending downwardly from said base, said teeth extending in a first direction;

a secondary restraint mounted within said wheel chock, the secondary restraint having a plurality of secondary restraint teeth extending from a bottom thereof, the secondary restraint teeth extending in a second direction which is generally opposed to said first direction; and a locking and unlocking motion mechanism to move the secondary restraint in a generally vertical direction between an engaged position and a disengaged position, the locking and unlocking motion mechanism comprising a hydraulic system.

3. A wheel chock restraint system comprising:

a wheel chock having a base, a plurality of teeth extending downwardly from said base, said teeth extending in a first direction;

a secondary restraint mounted within said wheel chock, the secondary restraint having a plurality of secondary restraint teeth extending from a bottom thereof, the secondary restraint teeth extending in a second direction which is generally opposed to said first direction; and a locking and unlocking motion mechanism to move the secondary restraint in a generally vertical direction between an engaged position and a disengaged position, the locking and unlocking motion mechanism comprising a pneumatic system.

\* \* \* \* \*